United States Patent
Ueda

(10) Patent No.: US 11,336,877 B2
(45) Date of Patent: May 17, 2022

(54) PROJECTION-TYPE DISPLAY DEVICE AND METHOD FOR ADJUSTING A PROJECTED IMAGE

(71) Applicant: NEC Display Solutions, Ltd., Tokyo (JP)

(72) Inventor: Takuya Ueda, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 594 days.

(21) Appl. No.: 16/326,646

(22) PCT Filed: Sep. 8, 2016

(86) PCT No.: PCT/JP2016/076474
§ 371 (c)(1),
(2) Date: Feb. 19, 2019

(87) PCT Pub. No.: WO2018/047277
PCT Pub. Date: Mar. 15, 2018

(65) Prior Publication Data
US 2021/0289181 A1 Sep. 16, 2021

(51) Int. Cl.
*H04N 9/31* (2006.01)
(52) U.S. Cl.
CPC ......... *H04N 9/3185* (2013.01); *H04N 9/3194* (2013.01)
(58) Field of Classification Search
CPC ..... H04N 9/3185; H04N 9/3194; G03B 21/14
See application file for complete search history.

(56) References Cited

U.S. PATENT DOCUMENTS

| 2009/0033888 A1* | 2/2009 | Nozaki | H04N 9/3185 353/119 |
| 2011/0157563 A1* | 6/2011 | Funada | H04N 9/3185 353/70 |
| 2017/0264871 A1* | 9/2017 | Fujiune | H04N 9/3194 |

FOREIGN PATENT DOCUMENTS

| JP | 2003-295310 A | 10/2003 |
| JP | 2012-103449 A | 5/2012 |
| JP | 2012-173378 A | 9/2012 |
| JP | 2013-083690 A | 5/2013 |

(Continued)

OTHER PUBLICATIONS

International Search Report (ISR) (PCT Form PCT/ISA/210), in PCT/JP2016/076474, dated Nov. 1, 2016.

*Primary Examiner* — John W Miller
*Assistant Examiner* — Humam M Satti
(74) *Attorney, Agent, or Firm* — McGinn I.P. Law Group, PLLC.

(57) ABSTRACT

This projection-type display device has: an operation signal detection unit that receives operation signals that indicate adjustment content of a projected image, the adjustment content having been instructed by way of an operation unit; an installation state detection unit that detects, as the installation state of the projection-type display device, a first state and a second state realized by rotating 90 degrees around an axis parallel to the optical axis of the projection lens; and a control unit that, upon detecting a signal that corresponds to the first direction by way of the operation signal detection unit in the first state and the second state, adjusts a projected image by shifting the projected image in the first direction or by moving a correction-object site in the projected image in the first direction.

10 Claims, 14 Drawing Sheets

(56) References Cited

FOREIGN PATENT DOCUMENTS

| | | |
|---|---|---|
| JP | 2014-134729 A | 7/2014 |
| JP | 2014-137450 A | 7/2014 |

\* cited by examiner

PROJECTION-TYPE DISPLAY DEVICE AND METHOD FOR ADJUSTING A PROJECTED IMAGE

TECHNICAL FIELD

The present invention relates to a projection-type display device and a method of adjusting the projected image.

BACKGROUND ART

Typically, a projection-type display device (a projector) is used in a horizontally-installed state (also referred to as a "floor-mounted state") in which the top plate of the projection-type display device is vertically upward, or, opposite the horizontally-installed state, a suspended state such as when hung from a ceiling such that the top plate of the projection-type display device is vertically downward. When the user uses a remote-controller or an operation panel provided on the projection-type display device to adjust the position of the projected image, the direction of shifting of the projected image may differ according to the horizontally installed state and the suspended state of the projection-type display device, even when performing the same key operation.

For example, when the "up key" of a remote controller or operation panel is pressed with the projection-type display device in the horizontally installed state, the projected image moves upward, but when the "up key" is pressed with the projection-type display device in the suspended state, the projected image may move downward. Further, when the "right key" of the remote controller or operation panel is pressed with the projection-type display device in the horizontally installed state, the projected image moves to the right, but when the "right key" is pressed with the projection-type display device in the suspended state, the projected image may move to the left. In such cases, the user will encounter difficulty in intuitively adjusting the direction of movement of the projected image.

In response, Patent Document 1 proposes using an acceleration sensor to detect whether the projection-type display device is in the horizontally installed state or the suspended state and then switching the direction of shift of the projected image that corresponds to the key operation of the remote controller or operation panel according to the detected installed state of the projection-type display device.

Rather than switching the direction of shift of the projected image according to the installed state of the projection-type display device, Patent Document 2 discloses using an acceleration sensor to detect the inclination in the perpendicular direction of the projection-type display device that is, for example, installed on a table, and then automatically correcting the trapezoidal distortion in the vertical direction of the projected image on the basis of this inclination.

In recent years, however, the states of use of projection-type display devices have come to include not only the states of use of displaying a projected image in the above-described horizontally installed state or suspended state but increasingly, states of use of displaying a projected image in a vertically arranged state in which the projection-type display device is installed such that the top plate is parallel to the vertical direction.

In such cases, the adjustment direction and the shift direction of the projected image differ despite the use of the same key operation due to the installed state of the projection-type display device, and the user therefore encounters difficulty in intuitively adjusting the position or shape of the projected image. The above-described Patent Documents 1 and 2 make no disclosures regarding the method of adjusting the projected image in such a vertically installed state of the projection-type display device.

RELATED ART DOCUMENTS

Patent Documents

Patent Document 1: JP 2014-137450 A
Patent Document 2: JP 2012-173378 A

SUMMARY

It is an object of the present invention to provide a projection-type display device and method of adjusting a projected image that allow various types of intuitive adjustment of a projected image by the user depending on the horizontally installed state and vertically installed state.

A projection-type display device of an exemplary aspect of the present invention for achieving the above-described objects is a projection-type display device that allows adjustment of a projected image and includes:

an operation signal detection unit that receives an operation signal that indicates the adjustment content of the projected image that was instructed by way of an operation unit;

an installation state detection unit that detects, as the installation state of the projection-type display device, a first state and a second state that is rotated 90 degrees from the first state around an axis that is parallel to the optical axis of the projection lens; and a control unit that, upon detecting a signal that corresponds to the first direction by way of the operation signal detection unit in the first state and the second state, adjusts the projected image by causing the projected image to shift in the first direction, or adjusts the projected image by causing a correction-object site in the projected image to move in the first direction.

The method of adjusting a projected image of an exemplary aspect of the present invention is a method of adjusting a projected image realized by a projection-type display device and includes steps of:

detecting, as the installation state of the projection-type display device, a first state and a second state that is rotated 90 degrees from the first state around an axis that is parallel to the optical axis of the projection lens; and upon detecting a signal corresponding to a first direction by way of an operation signal detection unit that receives operation signals that indicate the adjustment content of the projected image that were instructed by way of an operation unit in the first state and the second state, adjusting the projected image by causing the projected image to shift in the first direction, or adjusting the projected image by causing a correction-object site in the projected image to move in the first direction.

EXEMPLARY EMBODIMENT

The present invention is next described using the accompanying drawings.

Figure 1:
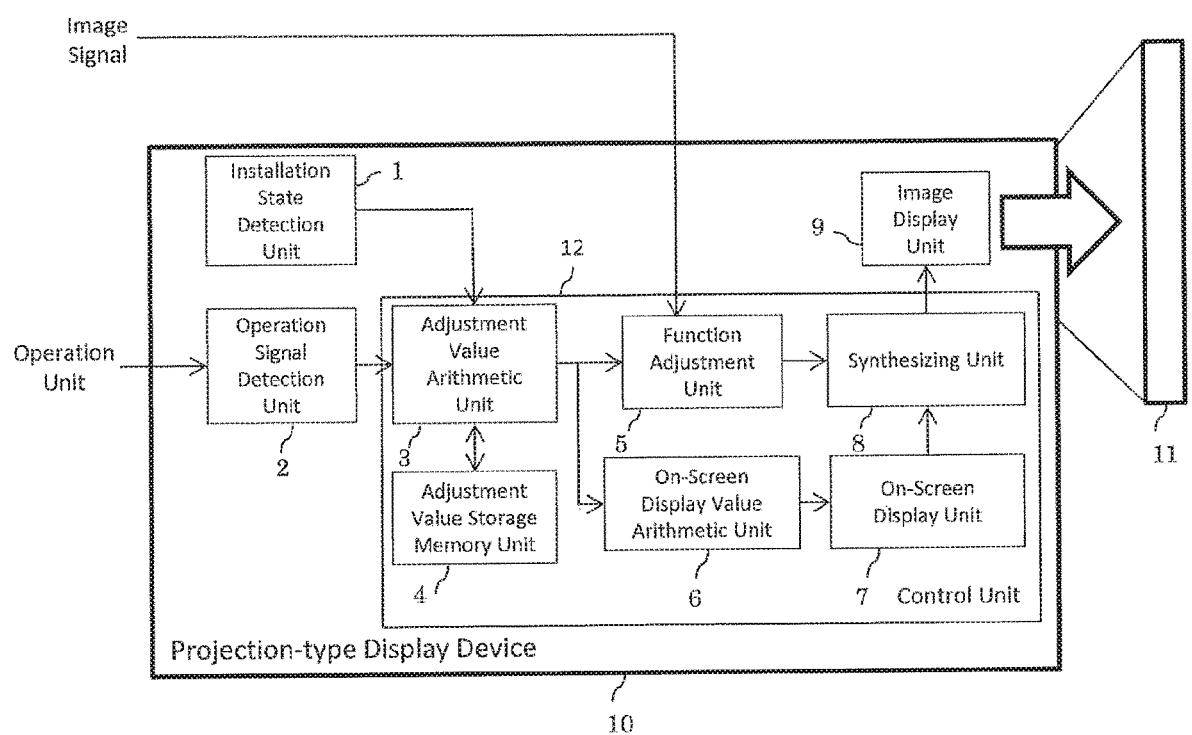
FIG. 1 is a block diagram showing an example of the configuration of the projection-type display device of the present invention.

FIG. 1 is a block diagram showing an example of the configuration of the projection-type display device of the present invention.

Figure 2:
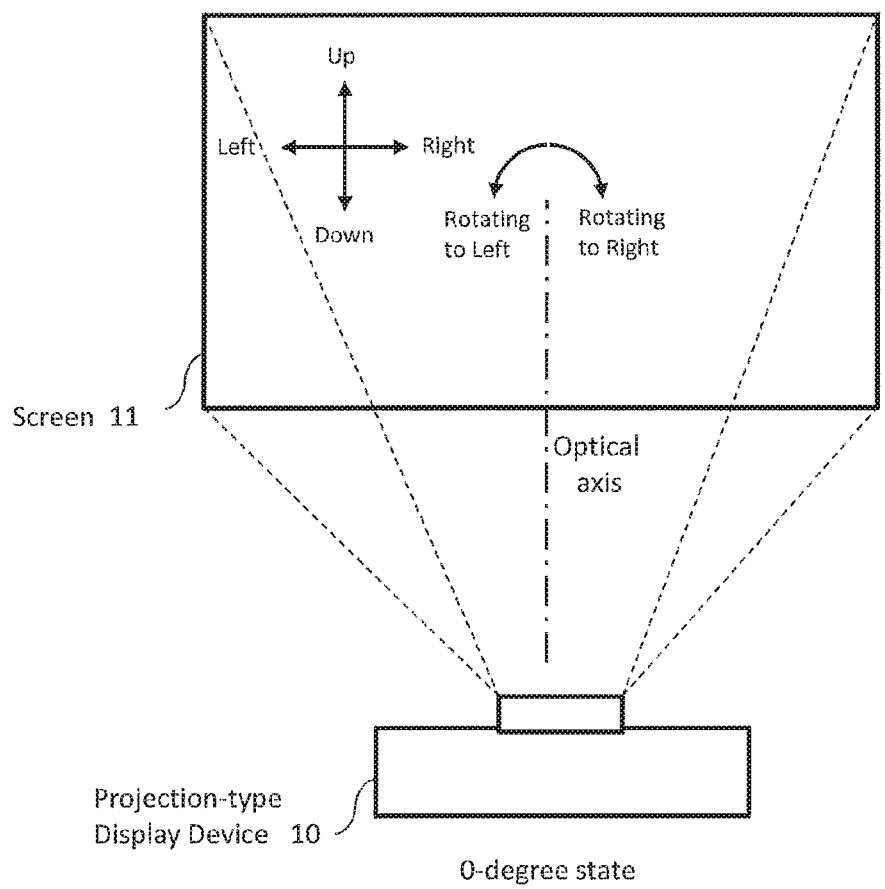
FIG. 2 is a front view showing an example of a horizontal installation state of the projection-type display device shown in FIG. 1.
Figure 3:
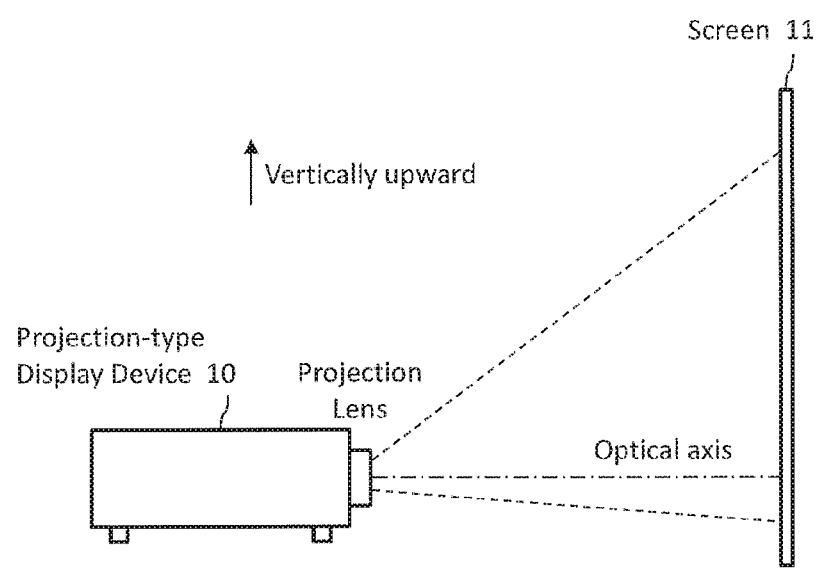
FIG. 3 is a side view showing an example of a horizontal installation state of the projection-type display device shown in FIG. 1.

FIGS. 2 and 3 are schematic views showing the horizontal installation state (first state) of the projection-type display device shown in FIG. 1, and FIGS. 4, 5, 6, and 7 are schematic views showing the vertical installation state (second state) of the projection-type display device shown in FIG. 1.

As shown in FIG. 1, projection-type display device 10 of the present invention has: installation state detection unit 1, operation signal detection unit 2, control unit 12, and image display unit 9.

Installation state detection unit 1 detects the installation state of projection-type display device 10 and supplies a signal indicating this installation state. The installation state of projection-type display device 10 in the present embodiment is the horizontal installation state of projection-type display device 10 or the vertical installation state of projection-type display device 10. Installation state detection unit 1 may use a known acceleration sensor to detect the installation state of projection-type display device 10. Installation state detection unit 1 may also detect the installation state of projection-type display device 10 by detecting the installation state of projection-type display device 10 that was entered by the user's use of, for example, a menu setting screen.

Operation signal detection unit 2 receives an operation signal that indicates adjustment content that was instructed from the user through the use of a remote controller or an operation panel. When the operation signal is received from a remote controller, a reception unit that receives the operation signal is provided in operation signal detection unit 2. The remote controller and operation signal detection unit 2 may transmit and receive an operation signal using, for example, known infrared ray communication and Bluetooth (registered trademark). Alternatively, when projection-type display device 10 is connected to a personal computer and thus operated, operation signal detection unit 2 may determine the content of instruction input by the user by analyzing the control signal that is transmitted from the personal computer. In the following explanation, a device including a remote controller or an operation panel that can receive instruction input by the user is referred to as the "operation unit".

On the basis of the operation signal received by operation signal detection unit 22 and the installation state (horizontal installation state and vertical installation state) of projection-type display device 10 that is detected by installation state detection unit 1, control unit 12 supplies an image signal in which a projected image has been shifted in a direction that accords with the horizontal installation state or vertical installation state of projection-type display device 10 or an image signal in which a correction-object site in the projected image is moved in a direction that accords with the horizontal installation state or vertical installation state of projection-type display device 10. When the projected image is to be shifted in a direction that accords with the horizontal installation state or vertical installation state of projection-type display device 10 by means of a lens-shifting method (to be described), control unit 12 may supply a control signal to image display unit 9 for adjusting the position of the projection lens.

Image display unit 9 is provided with, for example, display elements such as liquid crystal panels or DMDs (Digital Micro-mirror Devices) and a projection lens. Image display unit 9 uses the display elements to modulate light that is emitted from a light source and form an image indicated by the image signal that was supplied from control unit 12 and projects the image upon a projection surface such as screen 11 by way of the projection lens. When a control signal for adjusting the position of the projection lens is received from control unit 12, image display unit 9 adjusts the position of the projection lens in accordance with the control signal.

When liquid crystal panels are used for the display elements, light that is emitted from, for example, the light source is partitioned into the three primary colors of red (R), green (G), and blue (B), and a projected image is formed for the light of each color by transmission through the three liquid crystal panels that take on each of these colors. The light of the three primary colors that has been transmitted through the liquid crystal panels is color-combined by, for example, a prism, and then passes through the projection lens to be projected upon, for example, a screen. There is also a configuration that uses a single liquid crystal panel for the display element. In this case, the light that is emitted from the light source is partitioned into the three primary colors red (R), green (G), and blue (B) on a time base, and a projected image is formed by successively transmitting the partitioned light of each color through the liquid crystal panel. The light that has been transmitted through the liquid crystal panel passes through a projection lens and is then projected on, for example, a screen.

When projection-type display device 10 is in the horizontal installation state, each liquid crystal panel is normally arranged such that the shorter sides are parallel to the vertical direction. In addition, when projection-type display device 10 is in the horizontal installation state, the projected image is normally disposed such that the shorter sides are parallel to the vertical direction.

On the other hand, when DMDs are used for the display elements, light that is emitted from the light source is partitioned into the three primary colors of red (R), green (G), and blue (B), and projected images of the light of each color are formed by reflecting the light by DMDs of three chips that each take on a respective color. The light of the three primary colors that is reflected by the DMDs is color-combined by, for example, a prism and then passes through a projection lens to be projected onto, for example, a screen. There is also a configuration that uses a DMD of one chip for the display element. In this case, the light that is emitted from the light source is partitioned on a time base into the three primary colors of red (R), green (G) and blue (B) and projected images are formed by successively reflecting by the DMD the light of each color that has been partitioned. The light that is reflected by the DMD passes through a projection lens to be projected onto, for example, a screen.

When DMDs of three chips are used for the display elements, the direction of arrangement of each DMD is not constrained. However, in this case as well, when projection-type display device 10 is in the horizontal installation state, an image is normally projected such that the short sides of the projected image are parallel to the vertical direction.

As shown in FIG. 1, control unit 12 is provided with adjustment value arithmetic unit 3, adjustment value storage memory unit 4, function adjustment unit 5, on-screen display value arithmetic unit 6, on-screen display unit 7, and synthesizing unit 8.

On the basis of the installation state of projection-type display device 10 that was detected by installation state detection unit 1 as well as the operation signal that was received by the operation signal detection unit 2, adjustment value arithmetic unit 3 calculates the value for adjusting (correcting) the projected image (hereinbelow referred to as "adjustment value") and the value of the adjustment range by the adjustment (correction) function that is instructed by the user.

The adjustment (correction) functions that are provided in projection-type display device 10 include such functions as: a shift adjustment function for shifting a projected image, a four-point correction function for correcting the positions of the four corner portions in the projected image, a blanking adjustment function for adjusting the vertical and horizontal display regions of a projected image, a keystone correction function for correcting the trapezoidal distortion of a projected image, a geometrical correction function for projecting a square image on screen 11 having a special shape such as a columnar surface or spherical surface, an edge-blending function for correction such that the borders between adjacent projected images are not perceived in multiprojection that uses a plurality of projection-type display devices to display a single image, a menu-position correction function for correcting the position of a menu image that is displayed in the display region of a projected image, and a PIP (picture-in-picture) display position correction function for correcting the position of a sub-image in a PIP function that inserts inside a projected image (the main image) an image (sub-image) that differs from the projected image.

The shift adjustment function of a projected image includes a digital shift method and an optical shift method (lens shift). The digital shift method is a method of vertically and horizontally shifting the position of an image that is formed in a display region in which the display element provided in projection-type display device 10 forms an image. The lens shift method is a method of horizontally and vertically shifting a projected image by moving the projection lens that is provided in image display unit 9.

Adjustment value storage memory unit 4 stores adjustment values that have been calculated in adjustment value arithmetic unit 3 and values of the adjustment range.

Function adjustment unit 5 realizes each of the above-described types of adjustment (correction) functions for a projected image on the basis of the values calculated in adjustment value arithmetic unit 3. An image signal that is supplied from outside devices such as a personal computer is applied as input to function adjustment unit 5. Function adjustment unit 5 generates and supplies image signals that correspond to the projected image following adjustment (correction) in accordance with the adjustment values that were calculated by adjustment value arithmetic unit 3.

On-screen display value arithmetic unit 6 generates display data for displaying on screen 11 adjustment values that were calculated by adjustment value arithmetic unit 3 and range (values) of the adjustment limits.

On-screen display unit 7 generates image signals for displaying the adjustment values and the range (values) of the adjustment limits from the display data that were generated by on-screen display value arithmetic unit 6.

Synthesizing unit 8 synthesizes the image signal that is supplied from function adjustment unit 5 and the image signal that is generated by on-screen display unit 7 and generates an image signal for projecting from projection-type display device 10.

Control unit 12 that includes adjustment value arithmetic unit 3, adjustment value storage memory unit 4, function adjustment unit 5, on-screen display value arithmetic unit 6, on-screen display unit 7, and synthesizing unit 8 shown in FIG. 1 can be realized by an information processing device (computer) that is provided with a CPU (Central Processing Unit) that executes processing in accordance with a program and a storage device.

Image display unit 9 can be realized by a known optical system that includes an optical modulation element (the above-described display element) that optically modulates light from the light source in accordance with an image signal and a projection lens.

FIGS. 2 and 3 are views showing the horizontal installation state (also referred to as a "floor-mounted state") in which the (direction of a) normal line that corresponds to a predetermined position of the top plate of a projection-type display device is orthogonal to the vertical direction.

Figure 4:
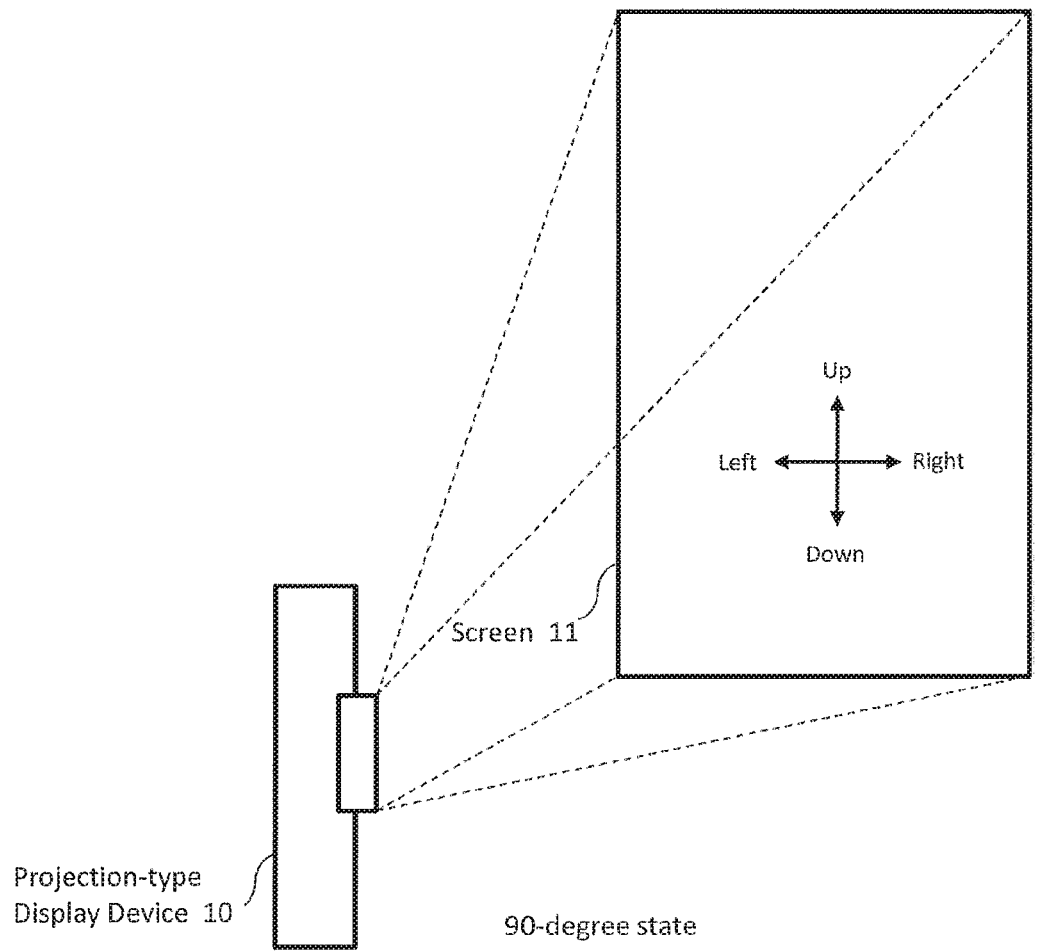
FIG. 4 is a front view showing an example of a vertical installation state of the projection-type display device shown in FIG. 1.
Figure 5:
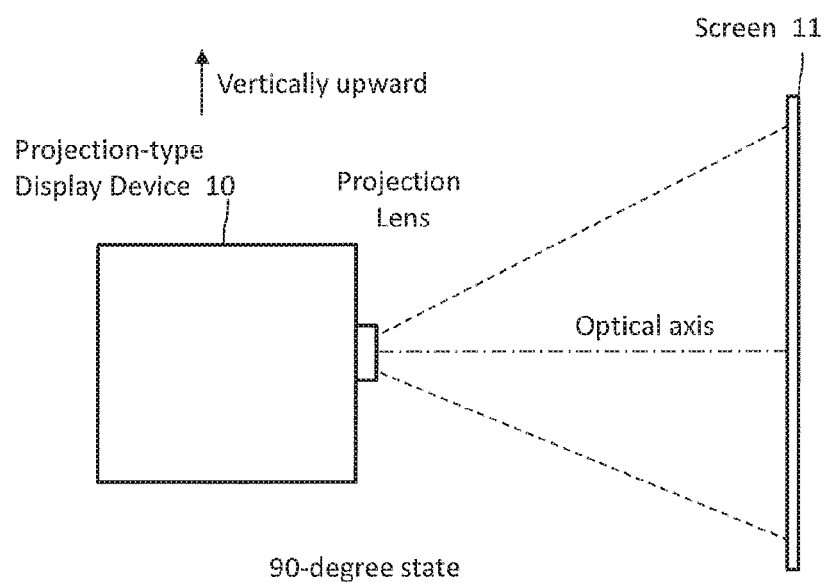
FIG. 5 is a side view showing an example of a vertical installation state of the projection-type display device shown in FIG. 1.

FIGS. 4 and 5 are views showing the vertical installation state in which the (direction of a) normal line corresponding to a predetermined position of the top plate of a projection-type display device is orthogonal to the vertical direction.

In other words, an installation state in which the normal line (the direction of the normal line) that is parallel to the vertical direction and that corresponds to a predetermined position of the top plate of a projection-type display device in the horizontal installation state becomes perpendicular to the vertical direction can be called vertical installation state. Further, the vertical installation state is a state realized by rotating 90 degrees from the horizontal installation state around an axis that is parallel to the optical axis of the projection lens.

Figure 6:
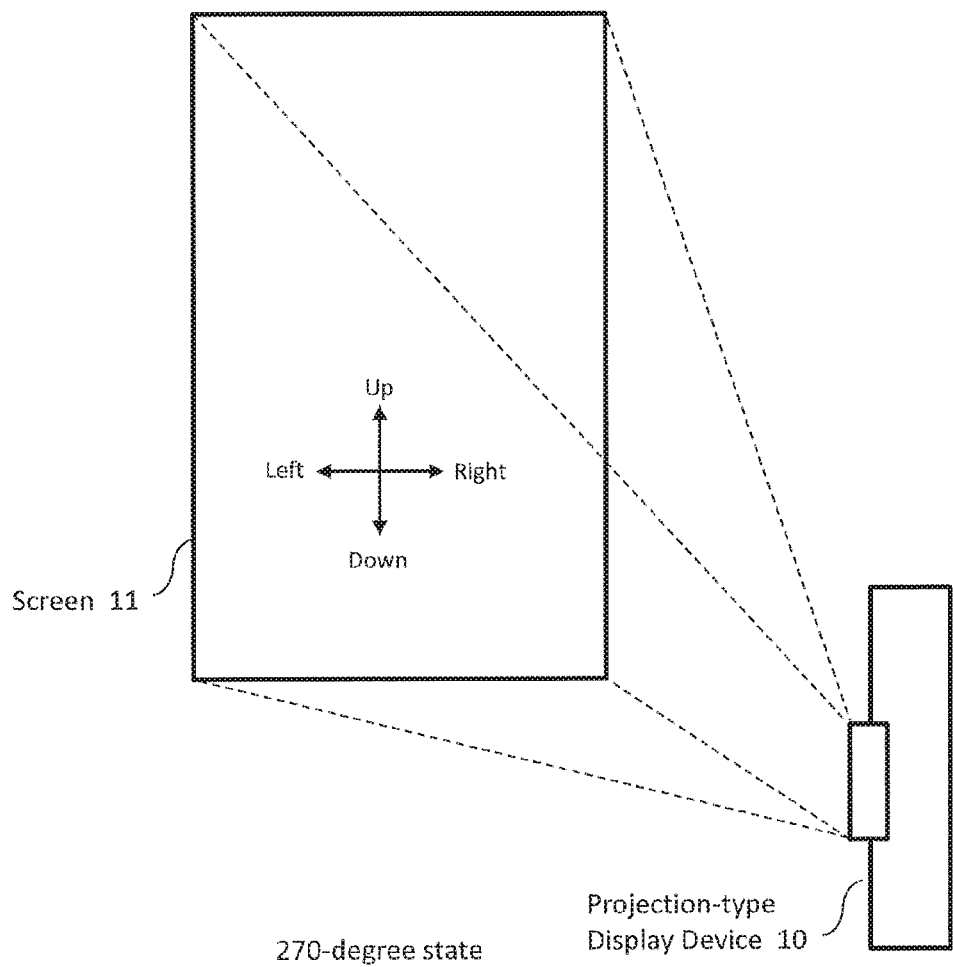
FIG. 6 is a front view showing another example of a vertical installation state of the projection-type display device shown in FIG. 1.
Figure 7:
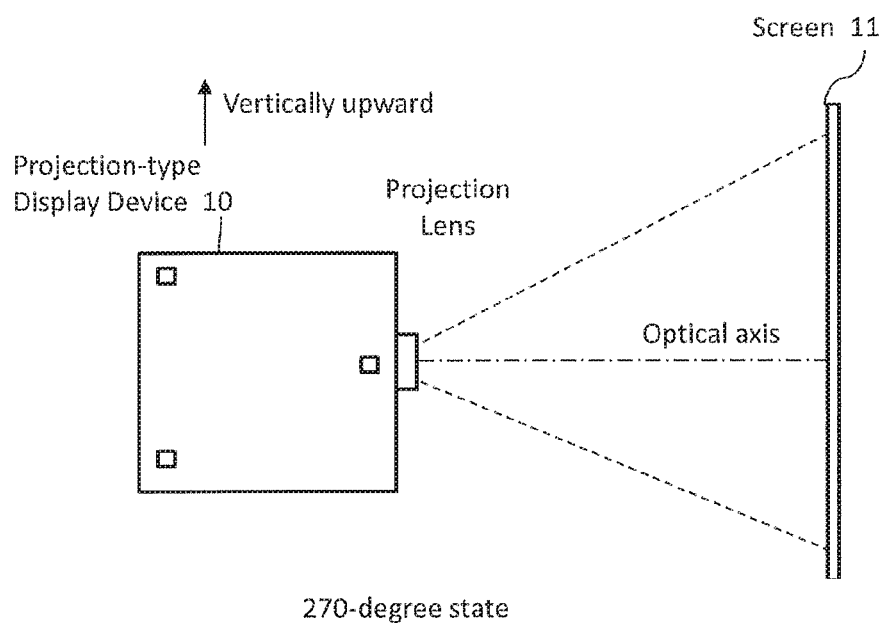
FIG. 7 is side view showing another example of a vertical installation state of the projection-type display device shown in FIG. 1.

In this type of configuration, in a projection-type display device of the present embodiment, the assignment of functions corresponding to each key of the operation unit are altered such that the adjustment (correction) direction or the direction of movement of a projected image become the same for the same key operation performed by a user using an operation unit for the horizontal installation state shown in FIGS. 2 and 3 and the vertical installation state shown in FIGS. 4 and 5 (including the vertical installation state (270-degree state) shown in FIGS. 6 and 7 to be described). For example, the vertical key is set by control unit 12 such that the direction of movement of a projected image or the direction of adjustment (correction) become the vertical direction for both the horizontal installation state and the vertical installation state, and the horizontal key is set by control unit 12 such that the direction of movement of a projected image or the direction of adjustment (correction) become the horizontal direction for both the horizontal installation state and the vertical installation state.

In other words, in the horizontal installation state and vertical installation state, upon detecting a signal corresponding to "left" by way of operation signal detection unit 2, control unit 12 causes the image that is projected upon a projection surface using a projection lens to shift to the left or causes a correction-object site in the projected image to move to the left. In the horizontal installation state and vertical installation state, control unit 12, upon detecting a signal that corresponds to "right" by way of operation signal detection unit 2, causes the projected image to shift to the right or causes a correction-object site in the projected image to move toward the right. In the horizontal installation state and vertical installation state, upon detecting a signal that corresponds to "up" by way of operation signal detection unit 2, control unit 12 causes the projected image to shift upward or causes a correction-object site in the projected image to move upward. In the horizontal installation state and vertical installation state, upon detecting a signal that corresponds to "down" by way of operation signal detection unit 2, control unit 12 causes the projected image to shift downward or causes a correction-object site in the projected image to move downward. The directions "up", "down", "left", and "right" are examples of the first direction.

Regarding the directions "up", "down", "left", and "right" on a projection surface on which the projection-type display device projects an image, the vertical up direction is upward, the vertical down direction is downward, and of the directions that are orthogonal to the vertical direction, the left as seen on the projection surface is leftward and the right is rightward. In other words, the directions "up", "down", "left", and "right" are the same on a projection surface whether the projection-type display device is in the horizontal installation state or in the vertical installation state.

The vertical installation state of projection-type display device 10 includes a state that is set by rotating 90 degrees to the right around an axis that is parallel to the optical axis of the projection lens from the horizontal installation state shown in FIGS. 2 and 3 (hereinbelow referred to as the "0-degree state") as shown in FIGS. 4 and 5 (hereinbelow referred to as the "90-degree state") and a state that is set by rotating 90-degrees to the left around an axis that is parallel to the optical axis of the projection lens as shown in FIGS. 6 and 7 (hereinbelow referred to as the "270-degree state").

As a result, in the 90-degree state, a projected image in the 0-degree state is displayed in a state that is rotated 90 degrees to the right around an axis that is parallel to the optical axis of the projection lens, and in the 270-degree state, a projected image in the 0-degree state is displayed in a state that is rotated 90 degrees to the left around an axis that is parallel to the optical axis of the projection lens.

FIG. 4 shows an example of projection-type display device 10 and a projected image in the 90-degree state, and FIG. 6 shows an example of projection-type display device 10 and a projected image in the 270-degree state. Normally, a horizontally long image is projected from a projection-type display device in the horizontal installation state as shown in FIG. 2, and a vertically long image is projected from a projection-type display device in the vertical installation state as shown in FIGS. 4 and 6, but depending on the image signal, a vertically long image may at times be projected even in the horizontal installation state and a horizontally long image may at times be projected even in the vertical installation state.

In the projection-type display device of the present embodiment, in the 90-degree state, a projected image that has been adjusted (corrected) on the basis of adjustment values in the 0-degree state is displayed rotated 90 degrees to the right around a central axis that is parallel to the optical axis of the projection lens. In addition, in the 270-degree state, a projected image that has been adjusted (corrected) on the basis of adjustment values in the 0-degree state is displayed rotated 90 degrees to the left around a central axis that is parallel to the optical axis of the projection lens.

In addition, in the 90-degree state, the direction of shift of the projected image in the 0-degree state is changed to a direction that is rotated 90 degrees to the right around an axis that is parallel to the optical axis of the projection lens, and in the 270-degree state, the direction of shift of the projected image in the 0-degree state is changed to a direction that is rotated 90 degrees to the left around an axis that is parallel to the optical axis of the projection lens.

Still further, in the 90-degree state, the site that is the object of adjustment (correction) of the projected image in the 0-degree state is changed to a position that has been rotated 90 degrees to the right around a central axis that is parallel to the optical axis of the projection lens, and the direction of movement of this site is changed to a direction that is rotated 90 degrees to the right around an axis that is parallel to the optical axis of the projection lens. Similarly, in the 270-degree state, the site that is the object of adjustment (correction) of the projected image in the 0-degree state is changed to a position that is rotated 90 degrees to the left around an axis that is parallel to the optical axis of the projection lens, and the direction of movement of this site is changed to a direction that is rotated 90 degrees to the left around an axis that is parallel to the optical axis of the projection lens.

As a result, when the projection-type display device of the present embodiment is changed from the horizontal installation state to the vertical installation state, the adjustment values and the breadth (values) of the adjustment range in the left-right directions in the projected image of the horizontal installation state are used in place of the adjustment values and the breadth (values) of the adjustment range of the up-down directions in the projected image of the vertical installation state, and the adjustment values and the breadth (values) of the adjustment range of the up-down directions in the projected image of the horizontal installation state are used in place of the adjustment values and the breadth (values) of the adjustment range of the left-right directions in the projected image of the vertical installation state.

On the other hand, when the projection-type display device is changed from the vertical installation state to the horizontal installation state, the adjustment values and breadth (values) of the adjustment range of the left-right directions in the projected image of the vertical installation state are used in place of the adjustment values and the breadth (values) of the adjustment range of the up-down directions in the projected image in the horizontal installation state, and the adjustment values and breadth (values) of the adjustment range of the up-down directions in the projected image of the vertical installation state are used in place of the adjustment values and breadth (values) of the adjustment range of the right-left directions in the projected image of the horizontal installation state.

A case is here considered in which, as the above-described adjustment values and values of the adjustment range, the leftward direction is defined as minus (−) and the rightward direction is defined as plus (+) for the left-right directions of a projected image, and the downward direction is defined as minus (−) and the upward direction is defined as plus (+) for the up-down directions of a projected image.

As described hereinabove, in the 90-degree state, the direction of shift of the projected image in the 0-degree state is changed to a direction that is rotated 90 degrees to the right around an axis that is parallel to the optical axis of the projection lens, or the site that is the object of adjustment (correction) is changed to a position that is rotated 90 degrees to the right around an axis that is parallel to the optical axis of the projection lens. As a result, the signs (±) of the adjustment values and values of the adjustment range in the up-down directions of the projected image are the opposite of the signs of the adjustment values and the values of the adjustment range of the left-right directions of the 0-degree state.

Further, in the 270-degree state, the shift direction of the projected image in the 0-degree state is changed to a direction that is rotated 90 degrees to the left around an axis that is parallel to the optical axis of the projection lens, or the site that is the object of adjustment (correction) is changed to a position that is rotated 90 degrees to the left around an axis that is parallel to the optical axis of the projection lens. As a result, the signs (±) of the adjustment values and the values of the adjustment range in the left-right directions of the projected image are the opposite of the signs of the adjustment values and values of the adjustment range of the up-down directions of the 0-degree state.

Accordingly, at the time of changing to the horizontal installation state or to the vertical installation state in the present embodiment, the adjustment values and the breadth (values) of the adjustment range of the left-right directions in the projected image are exchanged with the adjustment values and the breadth (values) of the adjustment range of the up-down directions in the projected image. Still further, the signs (±) of the adjustment values and the values of the adjustment range of the up-down directions in the 90-degree state are reversed, and the signs (±) of the adjustment values and the values of the adjustment range of the left-right directions in the 270-degree state are reversed.

Function adjustment unit 5 realizes each type of the above-described adjustment (correction) functions for a projected image on the basis of the above-described calculation results by adjustment value arithmetic unit 3. In addition, function adjustment unit 5 changes the assignment of the functions for each key of the operation unit such that the direction of movement of a projected image or the direction of adjustment (correction) is the same for the same key operation by the user using the operation unit in the horizontal installation state and vertical installation state of projection-type display device 10.

As described hereinabove, there are cases in which projection-type display device 10 is used in a suspended state (180-degree state). For example, when changed from the horizontal installation state (0-degree state) to the suspended state (180-degree state), the assignment of functions for each key of the operation unit should be made the opposite. In this case, the "up key" is set such that the direction of movement or the direction of adjustment (correction) of the projected image is upward for both the horizontal installation state and the suspended state, and the "down key" is set such that the direction of movement or the direction of adjustment (correction) of the projected image is downward for both the horizontal installation state and suspended state. Similarly, the "right key" is set such that the direction of movement or direction of adjustment (correction) of a projected image is rightward for both the horizontal installation state and the suspended state, and the "left key" is set such that the direction of movement or the direction of adjustment (correction) of a projected image is leftward for both the horizontal installation state and the suspended state. In addition, when changing from the horizontal installation state (0-degree state) to the suspended state (180-degree state), the signs (±) of each of the adjustment values in the left-right directions and up-down directions of a projected image should use values in which each sign is the opposite.

The operations of the projection-type display device of the present embodiment are next described using the accompanying drawings.

Figure 8:
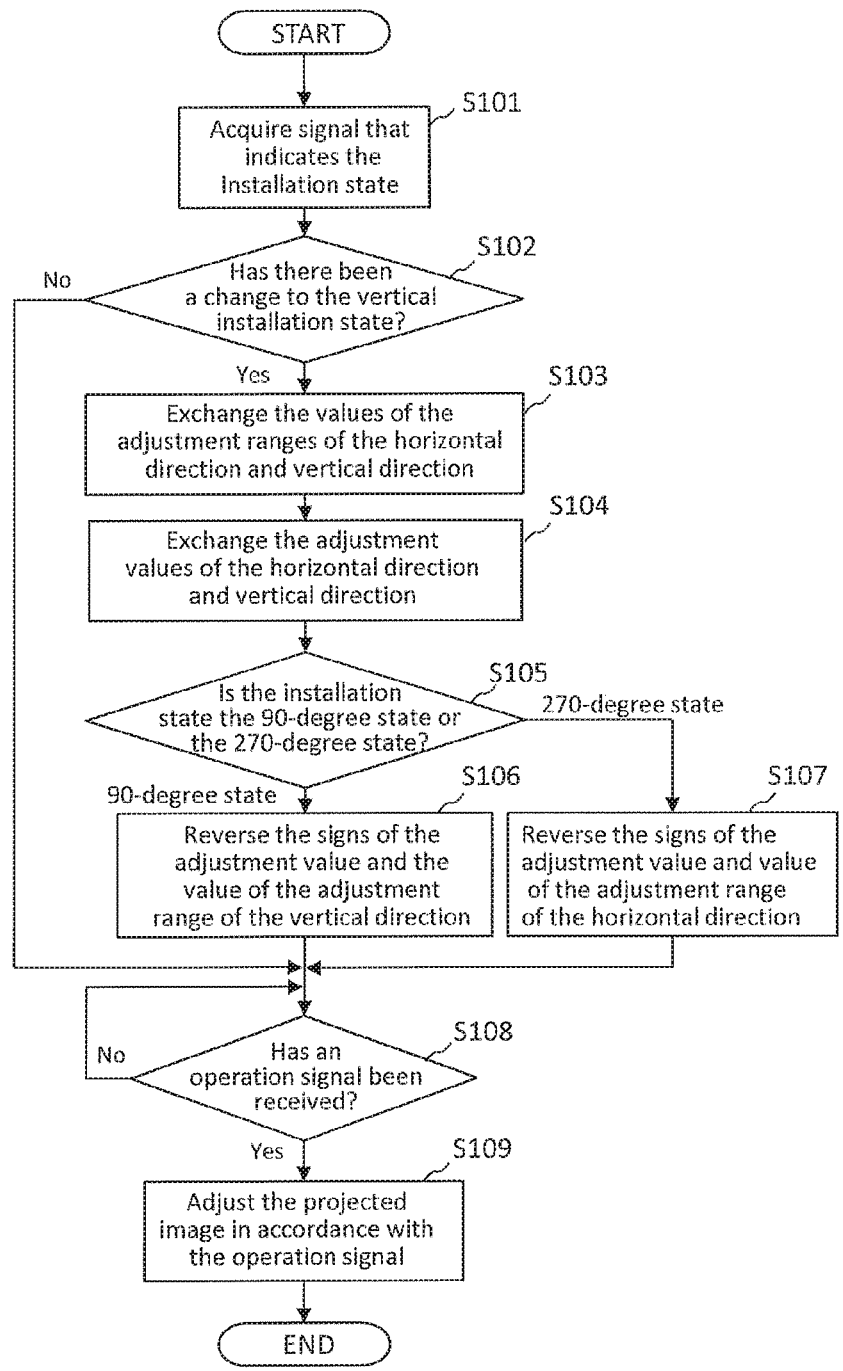
FIG. 8 is a flow chart showing the operation of the projection-type display device shown in FIG. 1.

FIG. 8 is a flow chart showing the operation of the projection-type display device shown in FIG. 1.

The operation of the projection-type display device shown in FIG. 8 is realized by control unit 12 shown in FIG. 1. FIG. 8 shows an example of processing when projection-type display device 10 is changed from the horizontal installation state to the vertical installation state. When projection-type display device 10 is changed from the vertical installation state to the horizontal installation state, it should first be determined in Step S102 (to be described) whether projection-type display device 10 has been changed to the horizontal installation state, and it should next be determined in Step S105 if the vertical installation state that preceded the horizontal installation state is the 90-degree state or the 270-degree state.

As shown in FIG. 8, for each predetermined processing period, control unit 12 acquires a signal that indicates the installation state of projection-type display device 10 and that is detected by installation state detection unit 1 (Step S101), and determines whether projection-type display device 10 has been changed from the horizontal installation state to the vertical installation state (90-degree state or 270-degree state) (Step S102). When projection-type display device 10 is changed from the horizontal installation state to the vertical installation state, control unit 12 transitions to the process of Step S108.

On the other hand, when projection-type display device 10 has been changed to the vertical installation state, control unit 12 replaces the breadth (values) of the adjustment range of the left-right directions of a projected image in the horizontal installation state with the breadth (values) of the adjustment range of the up-down directions in the vertical installation state, and replaces the breadth (values) of the adjustment range of the up-down directions of a projected image in the horizontal installation state with the breadth (values) of the adjustment range of the left-right directions in the vertical installation state (Step S103). Control unit 12 further replaces the adjustment values of the left-right directions of a projected image in the horizontal installation state with the adjustment values of the up-down directions in the vertical installation state and replaces the adjustment values of the up-down directions of a projected image in the horizontal installation state with the adjustment values of the left-right directions in the vertical installation state (Step S104).

Control unit 12 next determines whether projection-type display device 10 is in the 90-degree state or the 270-degree state (Step S105), and if projection-type display device 10 is in the 90-degree state, reverses each of the signs (±) of the values of the adjustment values and values of the adjustment ranges of the up-down directions of the projected image (Step S106).

In addition, when projection-type display device 10 is in the 270-degree state, control unit 12 reverses each of the signs (±) of the adjustment values and the values of the adjustment ranges of the left-right directions of a projected image in the horizontal installation state (Step S107).

Control unit 12 subsequently determines whether an operation signal has been received (Step S108), and when an operation signal has not been received, returns to the process of Step S108 and awaits an operation signal. On the other hand, when an operation signal has been received, control unit 12 adjusts (corrects) the projected image in accordance with the operation signal (Step S109).

As described above, in projection-type display device 10 of the present embodiment, on the basis of the installation state of projection-type display device 10, the projected image is caused to shift in a direction that accords with the horizontal installation state or vertical installation state of projection-type display device 10 or a site that is the object of correction in the projected image is caused to move in a direction that accords with the horizontal installation state or vertical installation state of projection-type display device 10 in accordance with instruction input that is realized through the user's use of the operation unit.

As a result, the user is able to intuitively and without confusion adjust (correct) a projected image that is displayed according to the installation state of projection-type display device 10. In addition, even if the installation state of projection-type display device 10 should change after the adjustment (correction) of the projected image, the appropriate adjustment values and adjustment ranges are displayed on screen 11 according to the installation state after the change.

Although an example was shown in the present embodiment in which the adjustment values and adjustment ranges that were instructed and applied as input from the user were changed according to the horizontal installation state or vertical installation state of projection-type display device 10, the present invention may also change the adjustment range and use other values for the adjustment values. In such cases, setting values that correspond to the installation states may be stored in advance and the corresponding setting values that were stored in advance may then be read in accordance with the installation state of projection-type display device 10 that is detected by installation state detection unit 1 and thus used as the adjustment values.

Embodiments

Embodiments of the present invention are next described using the accompanying drawings.

In each of the following embodiments, the method of adjusting a projected image realized by projection-type display device 10 of the present embodiment is described for a case in which the installation state of projection-type display device 10 is changed from the 0-degree state shown in FIG. 2 to the 90-degree state shown in FIG. 3 and a case in which projection-type display device 10 is changed from the 0-degree state to the 270-degree state.

Embodiment 1

The first embodiment is an example of adjustment that uses the above-described shift adjustment function of the projected image. In the first embodiment, however, an example is described that uses the above-described digital shift method.

In the following explanation, the position in the left-right direction in a projected image is referred to as the H (Horizontal) position, and the position in the up-down direction of a projected image is referred to as the V (Vertical) position.

Figure 9:
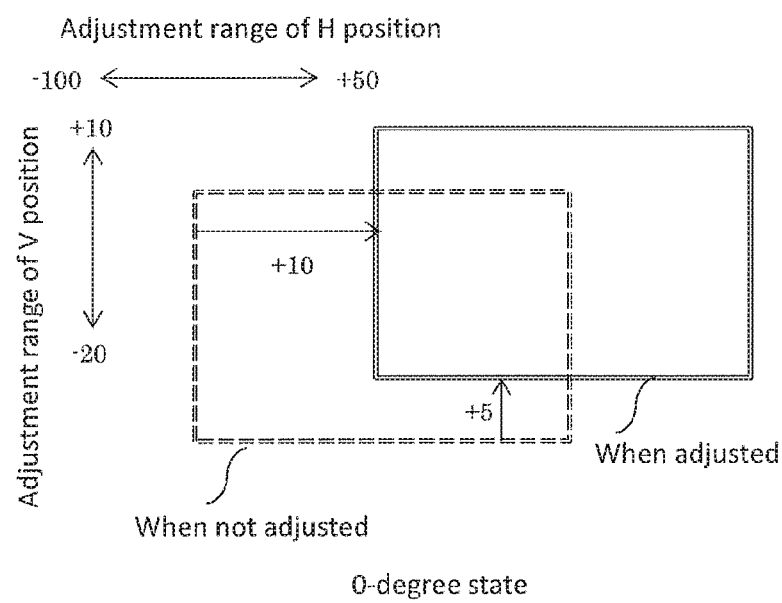
FIG. 9 is a plan view showing an example of the shift adjustment function for a projected image that is projected from a projection-type display device in the horizontal installation state shown in FIG. 2.
Figure 10:
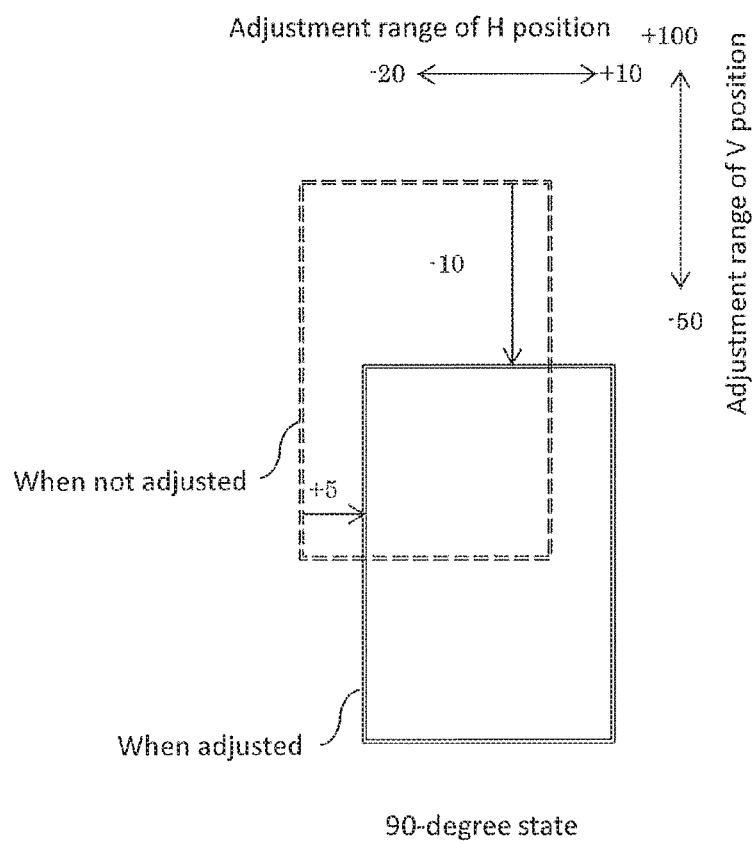
FIG. 10 is a plan view showing an example of the shift adjustment function for a projected image that is projected from a projection-type display device in the vertical installation state shown in FIG. 4.
Figure 11:
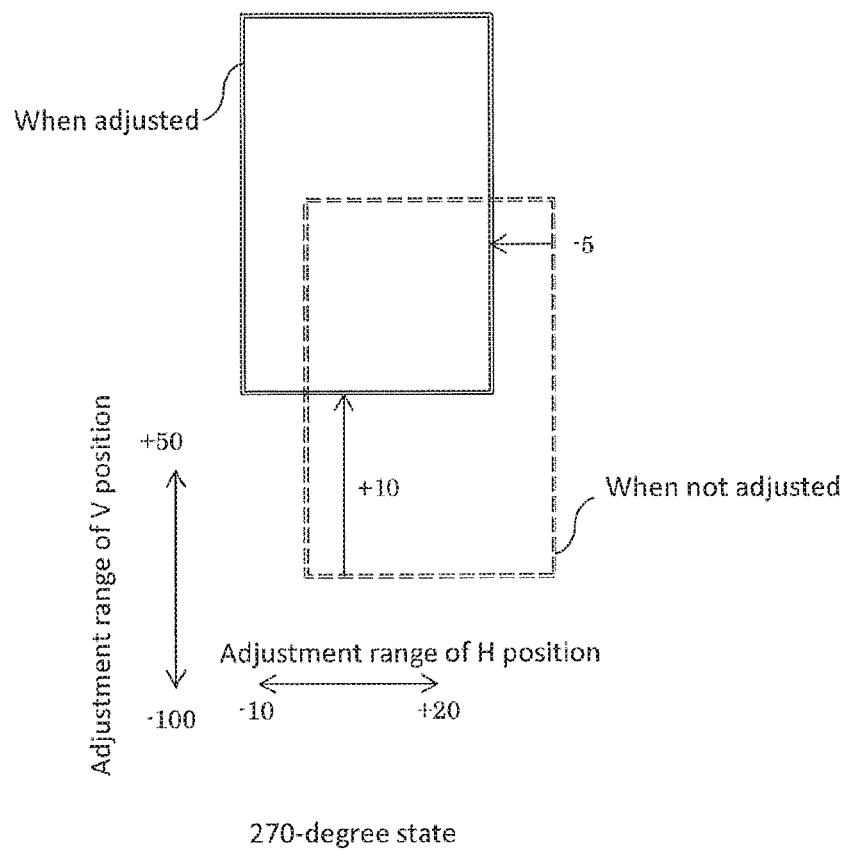
FIG. 11 is a plan view showing an example of the shift adjustment function for a projected image that is projected from a projection-type display device in the vertical installation state shown in FIG. 6.

FIG. 9 is a plan view showing an example of the shift adjustment function for a projected image that is projected from a projection-type display device in the horizontal installation state shown in FIG. 2. FIG. 10 is a plan view showing an example of the shift adjustment function for a projected image that is projected from the projection-type display device in the vertical installation state shown in FIG. 4. FIG. 11 is a plan view showing an example of the shift adjustment function for a projected image that is projected from a projection-type display device in the vertical installation state shown in FIG. 6.

FIG. 9 shows an example when the installation state of projection-type display device 10 is the 0-degree state and the adjustment range of the H position realized by means of the digital shift function is from −100 (the image moves leftward) to +50 (the image moves rightward) and the adjustment range of the V position is from −20 (the image moves downward) to +10 (the image moves upward).

When the adjustment value of the H position is changed toward the left (negative (−)), the projected image moves leftward. When the adjustment value of the H position changes to the right (positive (+)), the projected image moves rightward. When the adjustment value of the V position is changed to the downward (negative (−)) direction, the projected image moves downward. When the adjustment value of the V position is changed to the upward (positive (+)) direction, the projected image moves upward. Regarding the values of the adjustment range, the H position indicates the value of the right-side end portion (the maximum value of the adjustment range: +50) and the value of the left-side end portion (minimum value of the adjustment range: −100), and the V position indicates the value of the upper end portion (maximum value of the adjustment range: +10) and the value of the lower end portion (the minimum value of the adjustment range: −20). In addition, FIG. 9 shows an example in which the adjustment value (shift value) in the H position is +10 and the adjustment value (shift value) in the V position is +5.

Regarding the adjustment value of the H position, when "0" is taken as the position of a projected image when not adjusted (reference position), the leftward direction is minus (−) and the rightward direction is plus (+). Regarding the adjustment value of the V position, when "0" is taken as the position of the projected image when not adjusted, the downward direction is minus (−) and the upward direction is plus (+).

Here, as shown in FIG. 9, a projected image in the 0-degree state (at the time of adjustment) is located toward the upper right on screen 11 with respect to the display region when not adjusted. In addition, as shown in FIG. 9, the adjustment ranges of the H position and V position as well as the current adjustment values in the H position and V position are each displayed in the projected image. In FIG. 9, in the interest of the convenience of explanation, the adjustment ranges and adjustment values are shown with the H position shown as an arrow (adjustment arrow) in the horizontal direction and the V position shown as an arrow (adjustment arrow) in the vertical direction and the adjustment values are displayed separately, but these values are preferably displayed in combination with the projected image. In addition, the display of the adjustment ranges and adjustment values may represent, for example, adjustment functions (H position and V position), and the arrows (adjustment arrows) or bars (adjustment bars) in the left-right direction that correspond to each of the functions may be displayed in the vicinity of the displayed adjustment function. In this case, the upward direction of the V position corresponds to the rightward direction of the adjustment arrow or adjustment bar in the left-right direction, and the downward direction of the V position may correspond to the adjustment arrow or the adjustment bar of the left-right direction Alternatively, an image may be displayed that shows the adjustment values and adjustment ranges with altered color or luminance of a portion of the adjustment arrow or adjustment bar without displaying the value of the adjustment range or the adjustment value.

In the state shown in FIG. 9, when the installation state of projection-type display device 10 changes from the 0-degree state to the 90-degree state, the projected image (when adjusted) is positioned toward the lower right on screen 11 with respect to the display area when not adjusted, as shown in FIG. 10.

At this time, as shown in FIG. 10, control unit 12 changes the adjustment range of the H position realized by the digital shift function to from −20 (the projected image moves leftward) to +10 (the projected image moves rightward) and changes the current adjustment value in the H position to +5.

In addition, control unit 12 changes the adjustment range of the V position realized by the digital shift function to from −50 (the projected image moves downward) to +100 (the projected image moves upward) and changes the current adjustment value in the V position to −10.

In other words, in the 90-degree state, the breadth (value) of the adjustment range of the V position in the 0-degree state is used as the adjustment range of the H position, and the breadth (value) of the adjustment range of the H position in the 0-degree state is used as the adjustment range of the V position. In addition, in the 90-degree state, the value (adjustment value) of the V position in the 0-degree state is used as the H position, and the value (adjustment value) of the H position in the 0-degree state is used as the V position.

However, as shown in FIG. 10, the signs (±) of the value (adjustment value) of the value of the H position and the value of the adjustment range of the H position in the 0-degree state are reversed and used for the value of the adjustment range of the V position and the value (adjustment value) of the V position in the 90-degree state.

As described hereinabove, in projection-type display device 10 in the 90-degree state shown in FIG. 10, the H position of the display region on screen 11 can be adjusted by the left-right key of the operation unit and the V position of the display region can be adjusted by the up-down key of the operation unit. In other words, the adjustment function of the V position in the 0-degree state is assigned to the left-right key of the operation unit, and the adjustment function of the H position in the 0-degree state is assigned to the up-down key of the operation unit.

On the other hand, when the installation state of projection-type display device 10 is changed from the 0-degree state to the 270-degree state, the projected image is positioned toward the upper left on screen 11 with respect to the display region when not adjusted, as shown in FIG. 11.

At this time, control unit 12 changes the adjustment range of the H position realized by the digital shift function to from −10 (the image moves leftward) to +20 (the image moves rightward) and changes the adjustment value in the H position to −5, as shown in FIG. 11.

Further, as shown in FIG. 11, control unit 12 changes the adjustment range of the V position realized by the digital shift function to from −100 (the image moves downward) to +50 (the image moves upward) and changes the adjustment value in the V position to +10.

In other words, in the 270-degree state, the breadth (value) of the adjustment range of the V position is used as the adjustment range of the H position, and the breadth (value) of the adjustment range of the H position is used as the adjustment range of the V position. In addition, in the 270-degree state, the value (adjustment value) of the V position in projection-type display device 10 in the 0-degree state is used as the H position and the value (adjustment value) of the H position in projection-type display device 10 in the 0-degree state is used as the V position.

However, as shown in FIG. 11, the value of the adjustment range of the H position and the value (adjustment value) of the H position in the 270-degree state use the value of the adjustment range of the V position and the value of the V position in the 0-degree state with the signs (±) reversed.

In projection-type display device 10 in the 270-degree state as well, the H position of the display region on screen 11 can be adjusted by the left-right key of the operation unit, and the V position of the display region can be adjusted by the up-down key of the operation unit. In other words, the function of adjusting the V position in the 0-degree state is assigned to the left-right key of the operation unit, and the function of adjusting the H position in the 0-degree state is assigned to the up-down key of the operation unit.

According to the first embodiment, on the basis of the installation state of projection-type display device 10, a projected image shifts in a direction that accords with the horizontal installation state or vertical installation state of projection-type display device 10 in accordance with instruction input carried out by the user through the use of the operation unit. Accordingly, the user is able to intuitively and without any sense of awkwardness adjust (shift) a displayed projected image according to the installation state of projection-type display device 10.

Embodiment 2

The second embodiment is an example of adjustment that uses the above-described four-point correction function that corrects the position of four corner parts in a projected image. An example is next described in which, of the four corner parts of a projected image, the position of the upper left corner in the 0-degree state is corrected.

Figure 12:
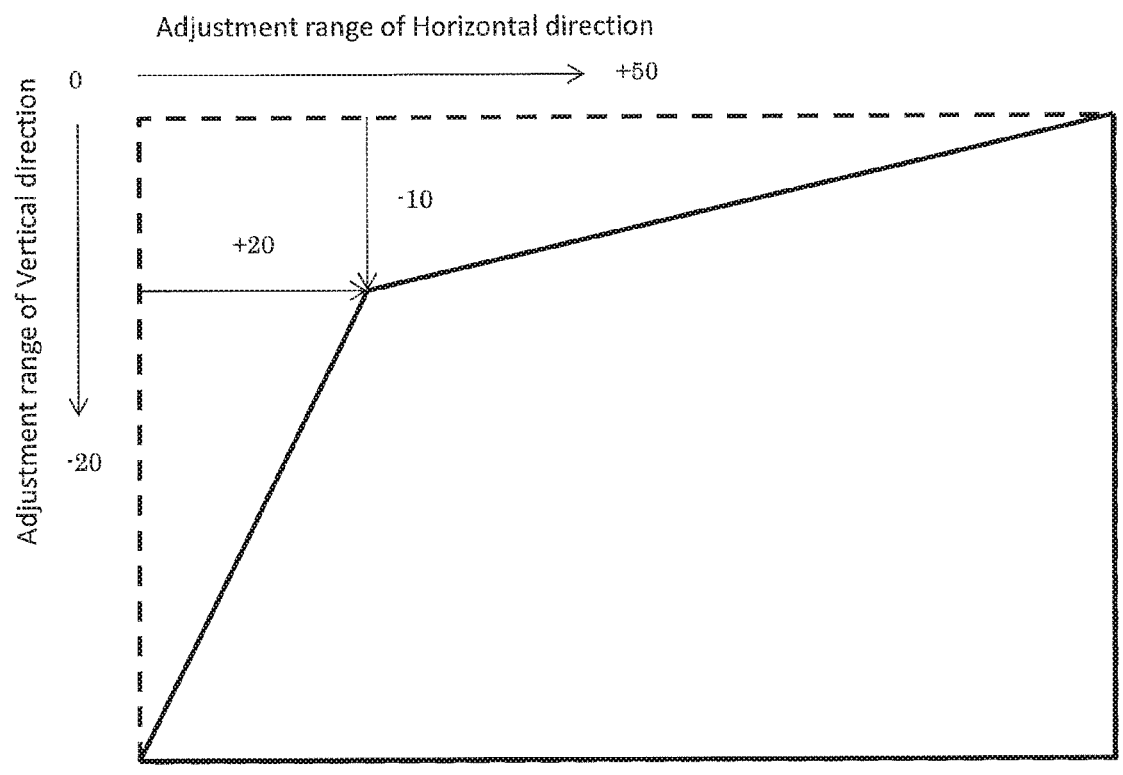
FIG. 12 is a plan view showing an example of the four-point correction function for a projected image that is projected from a projection-type display device in the horizontal installation state shown in FIG. 2.
Figure 13:
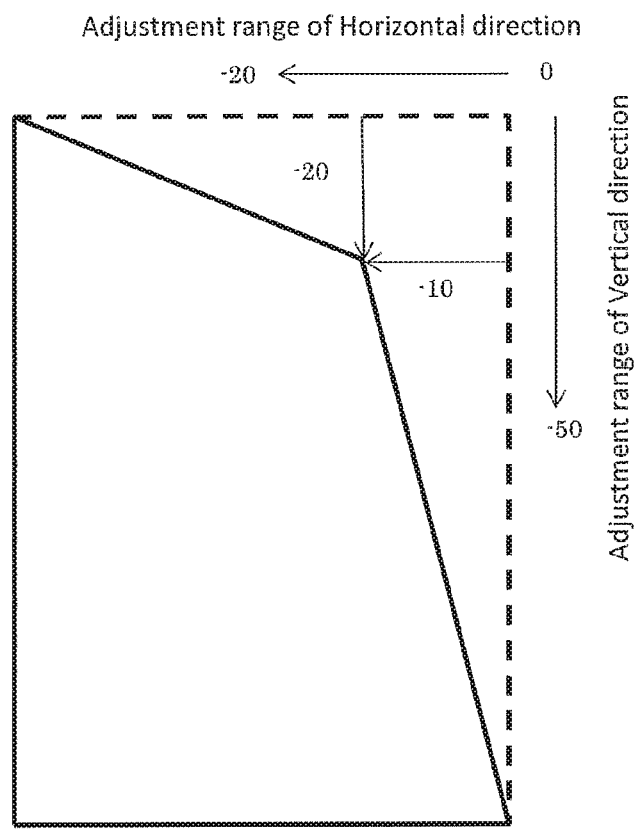
FIG. 13 is a plan view showing an example of the four-point correction function for a projected image that is projected from a projection-type display device in the vertical installation state shown in FIG. 4.
Figure 14:
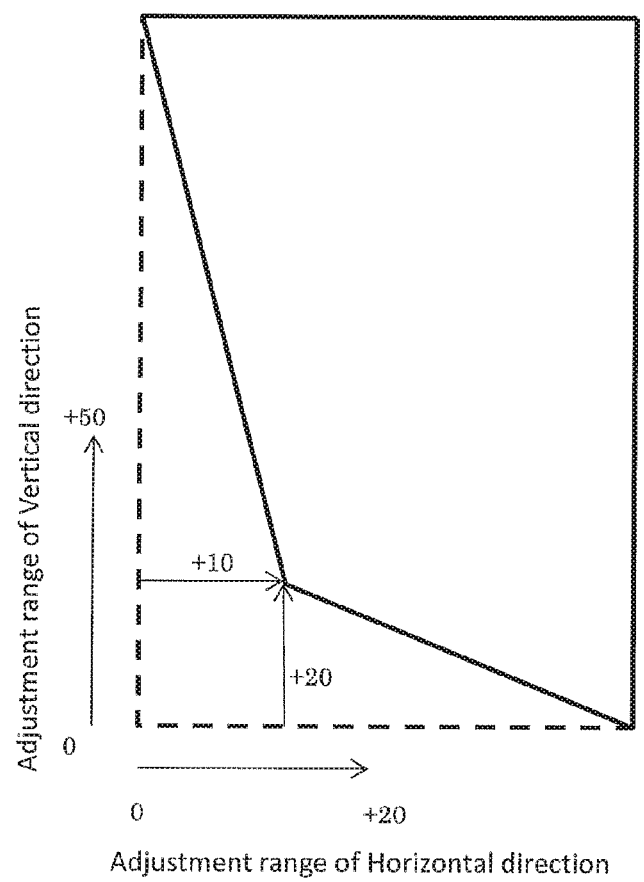
FIG. 14 is a plan view showing an example of the four-point correction function for a projected image that is projected from a projection-type display device in the vertical installation state shown in FIG. 6.

FIG. 12 is a plan view showing an example of the four-point correction function for a projected image that is projected from the projection-type display device in the horizontal installation state shown in FIG. 2. FIG. 13 is a plan view showing an example of the four-point correction function for a projected image that is projected from the projection-type display device in the vertical installation state shown in FIG. 4, and FIG. 14 is a plan view showing an example of the four-point correction function for a projected image that is projected from the projection-type display device in the vertical installation state shown in FIG. 6.

FIG. 12 shows an example in which, in the upper left corner part of a projected image using the four-point correction function when the installation state of projection-type display device 10 is the 0-degree state, the adjustment range in the left-right directions is from 0 (the image is corrected toward the left) to +50 (the image is corrected toward the right) and the adjustment range in the up-down directions is from −20 (the image is corrected downward) to 0 (the image is corrected upward). In addition, FIG. 7 shows an example in which the adjustment value in the left-right directions is +20 and the adjustment range in the up-down directions is −10.

When the position of the upper left corner part of a projected image when not adjusted is taken as 0, the adjustment value in the rightward direction of the left-right directions is assumed to be plus (+)and the adjustment value in the downward direction of the up-down directions is assumed to be minus (−).

At this time, as shown in FIG. 12, the upper left corner part in a projected image following adjustment moves toward the lower right with respect to the projected image when not adjusted. Further, as shown in FIG. 12, the adjustment ranges in left-right directions and up-down directions, as well as the current adjustment values in the left-right directions and up-down directions are each displayed in the projected image.

In the state shown in FIG. 12, when the installation state of projection-type display device 10 is changed from the 0-degree state to the 90-degree state, the upper right corner part becomes the object of correction in the projected image that follows the change.

At this time, as shown in FIG. 13, control unit 12 changes the adjustment range in the left-right directions in the upper right corner part of the projected image to from −20 (the image moves toward the left) to 0 (the image moves toward the right) and changes the adjustment value in the left-right directions to −10. In addition, control unit 12 changes the adjustment range in the up-down directions in the upper right corner part of the projected image to from 0 (the image moves upward) to −50 (the image moves downward) and changes the adjustment value in the up-down directions to −20.

In other words, in the 90-degree state, the breadth (value) of the adjustment range in the up-down directions at the upper left corner part of a projected image in the 0-degree state is used as the adjustment range in the left-right directions of the upper right corner part of a projected image. In addition, in the 90-degree state, the breadth (value) of the adjustment range in the left-right directions at the upper left corner part of the projected image of the 0-degree state is used as the adjustment range in the up-down directions in the upper right corner part of the projected image.

Still further, in the 90-degree state, the adjustment value in the up-down direction at the upper left corner part of the projected image in the 0-degree state is used as the adjustment value in the up-down directions at the upper right corner part of the projected image. In addition, in the 90-degree state, the adjustment value in the left-right directions at the upper left corner part of the projected image in the 0-degree state is used as the adjustment value in the up-down directions at the upper right corner part of the projected image.

However, as shown in FIG. 13, values obtained by reversing each of the signs (±) of the value of the adjustment range in the left-right directions and the adjustment value of the left-right directions are used for the value of the adjustment range and the adjustment value of the up-down directions in the 90-degree state.

In the 90-degree state shown in FIG. 13, the left-right directions at the upper right corner part of the projected image can be corrected by the left-right key of the operation unit, and the up-down directions in the upper right corner part of the projected image can be corrected by the up-down key of the operation unit. In other words, the function of adjusting the up-down directions in the 0-degree state is assigned to the left-right key of the operation unit, and the function of adjusting the left-right directions in the 0-degree state is assigned to the up-down key of the operation unit.

On the other hand, in the state shown in FIG. 12, when the installation state of projection-type display device 10 is changed from the 0-degree state to the 270-degree state, the lower left corner part becomes the object of correction in the projected image that follows the change.

At this time, as shown in FIG. 14, control unit 12 changes the adjustment range in the left-right directions at the lower left corner part of the projected image to from 0 (the image moves toward the right) to +20 (the image moves toward the left) and changes the current adjustment value in the left-right direction to +10.

Control unit 12 further changes the adjustment range in the up-down directions at the lower left corner part of the projected image to from 0 (the image moves downward) to +50 (the image moves upward) and changes the current adjustment value in the up-down direction to +20.

In other words, in the 270-degree state, the breadth (value) of the adjustment range in the up-down directions at the upper left corner part of the projected image in the 0-degree state is used as the adjustment range in the left-right direction at the lower left corner part of the projected image. In addition, in the 270-degree state, the breadth (value) of the adjustment range in the left-right directions at the upper left corner part of the projected image in the 0-degree state is used as the adjustment range in the up-down directions at the lower left corner part of the projected image.

Still further, in the 270-degree state, the adjustment value in the up-down directions at the upper left corner part of the projected image in the 0-degree state is used as the adjustment value in the up-down directions at the lower left corner part of the projected image. In addition, in the 270-degree state, the adjustment value of the left-right directions at the upper left corner part of the projected image of the 0-degree state is used as the adjustment value of the up-down directions at the lower left corner part of the projected image.

However, as shown in FIG. 14, values obtained by reversing each of the signs (±) of the value of the adjustment range in the up-down directions and the adjustment value of the up-down directions in the 0-degree state are used for the value of the adjustment range and the adjustment value of the left-right directions in the 270-degree state.

In the 270-degree state as well, the left-right directions at the lower left corner part of the projected image can be corrected by the left-right key of the operation unit, and the up-down directions of the lower left corner part of the projected image can be corrected by the up-down key of the operation unit. In other words, the function of adjusting the up-down directions in the 0-degree state is assigned to the left-right key of the operation unit, and the function of adjusting the left-right directions in the 0-degree state is assigned to the up-down key of the operation unit.

In the foregoing explanation, an example was shown in which the position of, of the four corner parts of a projected image, the upper left corner part in the 0-degree state is corrected, but the correction of the positions of the upper right corner part, the lower left corner part, and the lower right corner part in the 0-degree state can be similarly adjusted.

According to the second embodiment, the site that is the object of correction in a projected image moves in a direction that depends on the horizontal installation state or vertical installation state of projection-type display device 10 in accordance with instruction input by the user that is realized through the use of an operation unit on the basis of the installation state of projection-type display device 10.

As a result, the user is able to intuitively and without awkwardness correct a projected image that is displayed according to the installation state of projection-type display device 10.

Embodiment 3

The third embodiment is an example of adjustment that uses the above-described blanking function.

The blanking function is a function of adjusting the vertical and horizontal display regions in a projected image as described above. As a result, the blanking function is similar to a process of correcting only the same values of two corner parts that are adjacent to the projected image to either the up-down directions or the left-right directions in the four-point correction function shown in the second embodiment.

Accordingly, in the third embodiment that uses the blanking function, the user is again able to intuitively and without any sense of awkwardness adjust (correct) a projected image that is displayed according to the installation state of projection-type display device 10 by processing that is similar to that of the second embodiment.

Embodiment 4

The fourth embodiment is an example of adjustment that uses the above-described keystone correction function.

The keystone correction function is a function of adjusting trapezoidal distortion in a projected image as described above. As a result, the keystone correction function is similar to the process of correcting two adjacent corner parts of a projected image in the up-down directions and left-right directions in the four-point correction function that was shown in the second embodiment.

Accordingly, in the fourth embodiment that uses the keystone correction function, the user is again able to intuitively and without awkwardness adjust (correct) a projected image that is displayed according to the installation state of projection-type display device 10 by processing that is similar to that of the second embodiment.

Embodiment 5

The fifth embodiment is an example of adjustment that uses the above-described geometric correction function.

The geometric correction function is a correction function for projecting a square image on a special-shaped screen such as a columnar surface or a spherical surface as described above. As a result, the geometric correction function is similar to the process in which the position that is the object of correction is changed to a central portion of four sides of a projected image in the four-point correction function shown in the second embodiment.

Accordingly, in the fifth embodiment that uses the geometric correction function, processing that is similar to the second embodiment enables the user to intuitively and without a sense of awkwardness adjust (correct) a projected image that is displayed according to the installation state of projection-type display device 10.

Embodiment 6

The sixth embodiment is an example of adjustment that uses the above-described edge-blending function.

The edge-blending function is a correction function for correcting such that the border between adjacent projected images cannot be perceived in multiprojection that displays one image using a plurality of projection-type display devices, as previously described. In other words, the edge-blending function is similar to the process of correcting two adjacent corner parts of a projected image to either one of the up-down direction and the left-right direction in the four-point correction function shown in the second embodiment.

Accordingly, in the sixth embodiment that uses the edge-blending function, the user is again able to intuitively and without a sense of awkwardness adjust (correct) a projected image that is displayed according to the installation state of projection-type display device 10 by processing similar to that of the second embodiment.

Embodiment 7

The seventh embodiment is an example of adjustment that uses the above-described lens shift method.

The lens shift method is a method of vertically and/or horizontally shifting an entire projected image by causing movement of the projection lens provided in image display unit 9 as described above. As a result, the lens-shift method can be realized by a process similar to the shift adjustment function that uses the digital shift method shown in the first embodiment.

Accordingly, in the seventh embodiment that uses the lens-shifting method as well, the user is able to intuitively and without a sense of awkwardness adjust (correct) a projected image that is displayed according to the installation state of projection-type display device 10 by processing similar to that of the first embodiment.

Embodiment 8

The eighth embodiment is an example of adjustment that uses the above-described menu position correction function.

The menu position correction function is a correction function for correcting the position of a menu image that is displayed within the display region of a projected image as described above. As a result, the menu position correction function is similar to a process in which the image that is the object of correction is changed to a menu image in the shift adjustment function shown in the first embodiment.

Accordingly, in the eighth embodiment that uses a menu position correction function, the user is again able to intuitively and without a sense of awkwardness adjust (correct) a menu image that is displayed according to the installation state of projection-type display device 10 by processing that is similar to that of the first embodiment.

Embodiment 9

The ninth embodiment is an example of adjustment that uses the above-described PIP display position correction function.

As described above, the PIP display position correction function is a correction function for correcting the position of a sub-image in a PIP (Picture In Picture) function that inserts inside a projected image (main image) an image (sub-image) that differs from the projected image. As a result, the PIP display position correction function is similar to a process in which an image that is the object of adjustment is changed to a sub-image in a shift adjustment function that uses the digital shift method that was shown in the first embodiment.

Accordingly, in the nine embodiment that uses the PIP display position correction function as well, the user is able to intuitively and without a sense of awkwardness adjust (correct) the position of a sub-image that is displayed according to the installation state of projection-type display device 10.

Although the invention of the present application has been described above with reference to embodiments, the invention of the present application is not limited to the above-described embodiments. The configuration and details of invention of the present application are open to various modifications within the scope of the gist of the invention of the present application that will be clear to one of ordinary skill in the art.

The invention claimed is:

1. A projection-type display device that allows adjustment of a projected image, comprising:
    an operation signal detection unit, configured to receive an operation signal that indicates adjustment content of said projected image that was instructed by way of an operation unit;
    an installation state detection unit, configured to detect, as the installation state of said projection-type display device, a first state and a second state that is rotated 90 degrees from said first state around an axis that is parallel to the optical axis of the projection lens; and
    a control unit that, upon detecting a signal that corresponds to a first direction by way of said operation signal detection unit in said first state and said second state, adjusts said projected image by causing said projected image to shift in said first direction, or adjusts said projected image by causing a correction-object site in said projected image to move in said first direction, wherein:
    said control unit, when said projection-type display device is changed from said first state to said second state, exchanges a breadth of the adjustment range which is instructed by way of said operation unit in the left-right directions of said projected image and the breadth of the adjustment range which is instructed by way of said operation unit in the up-down directions of said projected image.

2. The projection-type display device according to claim 1, wherein:
    said second state includes:
        a 90-degree state in which said projection-type display device of said first state is rotated 90 degrees to the right around an axis that is parallel to the optical axis of said projection lens; and
        a 270-degree state in which said projection-type display device of said first state is rotated 90 degrees to the left around an axis that is parallel to the optical axis of said projection lens; and
    said control unit:
        in the 90-degree state, reverses a sign of the value of the adjustment range in the up-down directions of said projected image; and
        in said 270-degree state, reverses a sign of the value of the adjustment range in the left-right directions of said projected image.

3. The projection-type display device according to claim 1, wherein:
    said control unit, when said installation state of said projection-type display device is changed from said first state to said second state, exchanges an adjustment value which is instructed by way of said operation unit in the left-right directions of said projected image and the adjustment value which is instructed by way of said operation unit in the up-down directions of said projected image.

4. The projection-type display device according to claim 2, wherein:
    said control unit:
        when said installation state of said projection-type display device is changed from said first state to said second state, exchanges an adjustment value which is instructed by way of said operation unit in the left-right directions of said projected image and the adjustment value which is instructed by way of said operation unit in the up-down directions of said projected image;
        in said 90-degree state, reverses the signs of the adjustment value and the value of the adjustment range in the up-down directions of said projected image, and
        in said 270-degree state, reverses the signs of the values of the adjustment value and the value of the adjustment range in the left-right directions of said projected image.

5. The projection-type display device according to claim 1, wherein a breadth of the adjustment range in the left-right directions of said projected image differs from the breadth of the adjustment range in the up-down directions of said projected image.

6. The projection-type display device according to claim 1, wherein said control unit causes an image that indicates an adjustment value and the adjustment range to be displayed together with said projected image.

7. The projection-type display device according to claim 1, wherein said first direction is any one direction from among the up, down, left, and right directions.

8. The projection-type display device according to claim 1, wherein in said first state, the short sides of a display element are parallel to the vertical direction.

9. The projection-type display device according to claim 1, wherein in said first state, the short sides of said projected image are parallel to the vertical direction.

10. A method of adjusting a projected image realized by a projection-type display device, comprising:
    detecting, as the installation type of said projection-type display device, a first state and a second state that is rotated 90 degrees from said first state around an axis that is parallel to the optical axis of the projection lens; and
    in said first state and said second state, upon detecting a signal corresponding to a first direction by way of an operation signal detection unit that receives operation signals that indicate the adjustment content of said projected image that was instructed by way of an operation unit, adjusting said projected image by causing said projected image to shift in said first direction, or adjusting said projected image by causing a correction-object site in said projected image to move in said first direction, wherein:

when said projection-type display device is changed from said first state to said second state, a breadth of the adjustment range which is instructed by way of said operation unit in the left-right directions of said projected image and the breadth of the adjustment range which is instructed by way of said operation unit in the up-down directions of said projected image exchange.

* * * * *